(12) United States Patent
Kinjou et al.

(10) Patent No.: US 8,018,111 B2
(45) Date of Patent: Sep. 13, 2011

(54) HYBRID-TYPE SYNCHRONOUS MACHINE

(75) Inventors: Hirofumi Kinjou, Obu (JP); Sadahisa Onimaru, Chiryu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 206 days.

(21) Appl. No.: 12/476,524

(22) Filed: Jun. 2, 2009

(65) Prior Publication Data

US 2009/0295249 A1 Dec. 3, 2009

(30) Foreign Application Priority Data

Jun. 2, 2008 (JP) ................................ 2008-144712

(51) Int. Cl.
*H02K 1/27* (2006.01)
*H02K 21/04* (2006.01)

(52) U.S. Cl. .............. 310/156.57; 370/156.53; 370/181; 370/216.015; 370/216.074

(58) Field of Classification Search ............ 310/156.48–156.65, 162, 165, 310/261.1, 181, 216.015, 216.057, 216.066, 310/216.074

See application file for complete search history.

(56) References Cited

U.S. PATENT DOCUMENTS

| | | | | |
|---|---|---|---|---|
| 3,411,027 A * | 11/1968 | Rosenberg | .................... | 310/181 |
| 3,427,486 A * | 2/1969 | Whitney | ........................ | 310/180 |
| 5,682,073 A | 10/1997 | Mizuno | | |
| 5,955,807 A | 9/1999 | Kajiura et al. | | |
| 6,462,449 B1 * | 10/2002 | Lucidarme et al. | ....... | 310/156.56 |
| 6,900,570 B2 * | 5/2005 | Ifrim | .............................. | 310/190 |
| 6,972,504 B1 * | 12/2005 | Hsu | ........................... | 310/156.56 |
| 7,567,006 B2 | 7/2009 | Ichiyama | | |
| 7,719,153 B2 * | 5/2010 | Hsu | ........................... | 310/156.58 |
| 2002/0180297 A1 * | 12/2002 | Ifrim | .............................. | 310/168 |
| 2009/0045691 A1 | 2/2009 | Ichiyama | | |
| 2009/0045765 A1 | 2/2009 | Ichiyama | | |

FOREIGN PATENT DOCUMENTS

JP 2001275326 A * 10/2001
JP 2006-141106 6/2006

OTHER PUBLICATIONS

Japanese Office Action dated Feb. 23, 2010, issued in corresponding Japanese Application No. 2008-144712, with English translation.

* cited by examiner

*Primary Examiner* — Tran Nguyen
(74) *Attorney, Agent, or Firm* — Nixon & Vanderhye, PC

(57) ABSTRACT

A rotor core has permanent magnets. Magnetic flux of the permanent magnet of an even-numbered rotor magnetic pole part is guided in an axial direction by an axial magnetic path member. Magnetic flux of the permanent magnet of an odd-numbered rotor magnetic pole part is guided into a soft magnetic inner cylindrical part. The axial end faces of the inner cylindrical part and the axial magnetic path member protrude from the rotor core in the axial direction and face a stationary magnetic path member with a small gap therebetween. The amount of magnetic flux of the magnet, which the permanent magnet applies to a stator core is adjusted by an excitation current of an excitation coil wound on the stationary magnetic path member.

7 Claims, 4 Drawing Sheets

HYBRID-TYPE SYNCHRONOUS MACHINE

CROSS REFERENCE TO RELATED APPLICATION

This application is based on and incorporates herein by reference Japanese Patent Application No. 2008-144712 filed on Jun. 2, 2008.

FIELD OF THE INVENTION

The present invention relates to a hybrid excitation-type synchronous machine, which includes a field coil and permanent magnets to generate field magnetic flux of a rotor.

BACKGROUND OF THE INVENTION

A synchronous machine includes a field coil-type synchronous machine, a permanent magnet-type synchronous machine and a reluctance motor. In the field coil-type synchronous machine, field magnetic flux of a rotor is generated by an excitation coil (field coil). In the permanent magnet-type synchronous machine, magnet flux generated by permanent magnets is used as filed magnetic flux. In the reluctance motor, reluctance torque is generated by magnetic resistance variation of a salient pole-type rotor core, which rotates relative to a salient pole-type stator core.

The permanent magnet-type synchronous machine is widely used for high efficiency use, because motor efficiency can be raised owing to no excitation loss in generating field magnetic flux. In the permanent magnet-type synchronous machine, a stator coil generates counter-electromotive force in a high speed rotation range, if it is operated over a wide rotor rotation speed range. It is the most common excitation reduction measure to configure a rotor to generate magnet magnetic flux torque and reluctance torque and reduce the magnet magnetic flux by d-axis current magnetic flux by adjusting d-axis current. However, if the d-axis current is reduced, loss due to the d-axis current is large.

In addition, a hybrid excitation system is proposed (JP 2006-141106A). In this system, a magnetic path (magnetic path of excitation coil), about which an excitation coil is wound, is provided in parallel to a magnetic path (magnetic path of a permanent magnet) having a permanent magnet in a magnetic path of a magnetic circuit (magnetic circuit of field magnetic flux), in which magnetic flux flows. By adjusting a current (excitation current) of an excitation coil, the amount of field magnetic flux in an electromagnetic gap between a rotor and a stator in the magnetic circuit of the field magnetic flux is adjusted. This synchronous machine, which uses both permanent magnets and an excitation coil and is operated by a hybrid magnetization system, is referred to as a hybrid excitation-type synchronous machine. In the hybrid excitation system according to JP 2006-141106A, the magnetic path of the excitation coil and the magnetic path of the magnet are arranged in parallel. For this reason, this magnetization system is referred to as a parallel-type hybrid excitation system.

However, according to the parallel-type hybrid excitation system, the magnetic flux of the magnet bypasses the magnetic path of the excitation coil if the excitation is not increased or decreased. As a result, the amount of magnetic flux of the magnet that crosses the stator coil decreases and hence torque decreases. If a large amount of field magnetic flux is required, an excitation current need be supplied to the excitation coil to generate a relatively strong magnetic filed. As a result, excitation loss increases.

The magnetic path of the excitation coil according to the conventional parallel-type hybrid excitation system is normally formed by a motor frame, which supplies and receives magnetic flux to and from the rotor core through the stator core. As a result, it is required to form a large motor frame by the use of soft steel, which is far heavier than aluminum, for example. Thus, the weight of the motor increases, and a part of the magnetic flux of the excitation coil is likely to leak to a bearing section.

SUMMARY OF THE INVENTION

It is an object of the present invention to provide a hybrid excitation-type synchronous machine, which is simple in magnetic path configuration and improves a parallel-type hybrid excitation system.

A hybrid excitation-type synchronous machine according to the present invention has a stator core, a rotor core, an even number of permanent magnets, an excitation coil and stationary magnetic path members. The rotor core includes a soft magnetic inner cylindrical part fixed to a rotation shaft and an even number of soft magnetic permanent magnets located radially outside the inner cylindrical part and arranged in a peripheral direction. The permanent magnets include first permanent magnets and second permanent magnets. The first permanent magnets are fixed to even-numbered rotor magnetic pole parts, which are located relative to an outer peripheral surface of the inner cylindrical part through a predetermined gap, and magnetize the even-numbered rotor magnetic pole parts to first magnetic polarity. The second permanent magnets are fixed to odd-numbered rotor magnetic pole parts, which are located in tight contact with the outer peripheral surface of the cylindrical part, and magnetize the odd-numbered rotor magnetic pole parts to second magnetic polarity. The stationary magnetic path members are located in proximity to end surfaces of the rotor core and face the inner cylindrical part and the even-numbered rotor magnetic pole parts through a predetermined gap.

According to this hybrid excitation-type synchronous machine, the even-numbered rotor magnetic pole parts of the rotor core is magnetically separated from the inner cylindrical part, which is a back yoke. The axial end parts of the even-numbered rotor magnetic pole parts and the inner cylindrical parts used as the back yoke are magnetically coupled by the stationary magnetic path member at a location proximate to the end surface of the rotor core. The excitation coil is wound on the stationary magnetic path member.

With this configuration, a magnetic circuit of field magnetic flux is formed such that the magnetic flux flowing from the permanent magnet of the odd-numbered rotor magnetic pole part to the stator core returns to the odd-numbered rotor magnetic pole part from the stator core through the permanent magnet of the even-numbered rotor magnetic pole part, the even-numbered rotor magnetic pole part and the inner cylindrical part. That is, in this magnetic circuit, the excitation coil wound on the stationary magnetic path member and the permanent magnet are arranged in series magnetically.

As a result, a series hybrid excitation-type synchronous machine can be formed, and hence the following advantages can be provided.

Since the excitation coil and the permanent magnet are arranged in series in the flux path of the field magnetic flux, the field magnetic flux can be increased without energizing the excitation coil in a mode that magnetism is not increased or decreased. That is, since loss of excitation current is not caused in an operation mode, in which the magnet magnetic flux is used to the maximum extent, the decrease in efficiency caused thereby can be minimized. For example, in an electric motor for a vehicle, the rotation speed of the rotor is not so large in most of its operation period, and no magnetization decreasing control is necessitated. Therefore, the magnetization loss is eliminated in most part of the operation period.

Further, the magnetic path of the field magnetic flux is formed by arranging the stationary magnetic path members in proximity to the end surfaces of the rotor core. Here, the stationary magnetic path member is interposed between the inner cylindrical part and the even-numbered rotor magnetic pole part, which is spatially (magnetically) separated from the inner cylindrical part used as the back yoke of the rotor core. Thus, the length of the magnetic path can be shortened. As a result, the weight of soft magnetic material having a large specific gravity can be reduced and hence the motor can be reduced in weight.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

A hybrid excitation-type synchronous machine according to a first embodiment will be described with reference to FIGS. 1 and 2.

Figure 1:
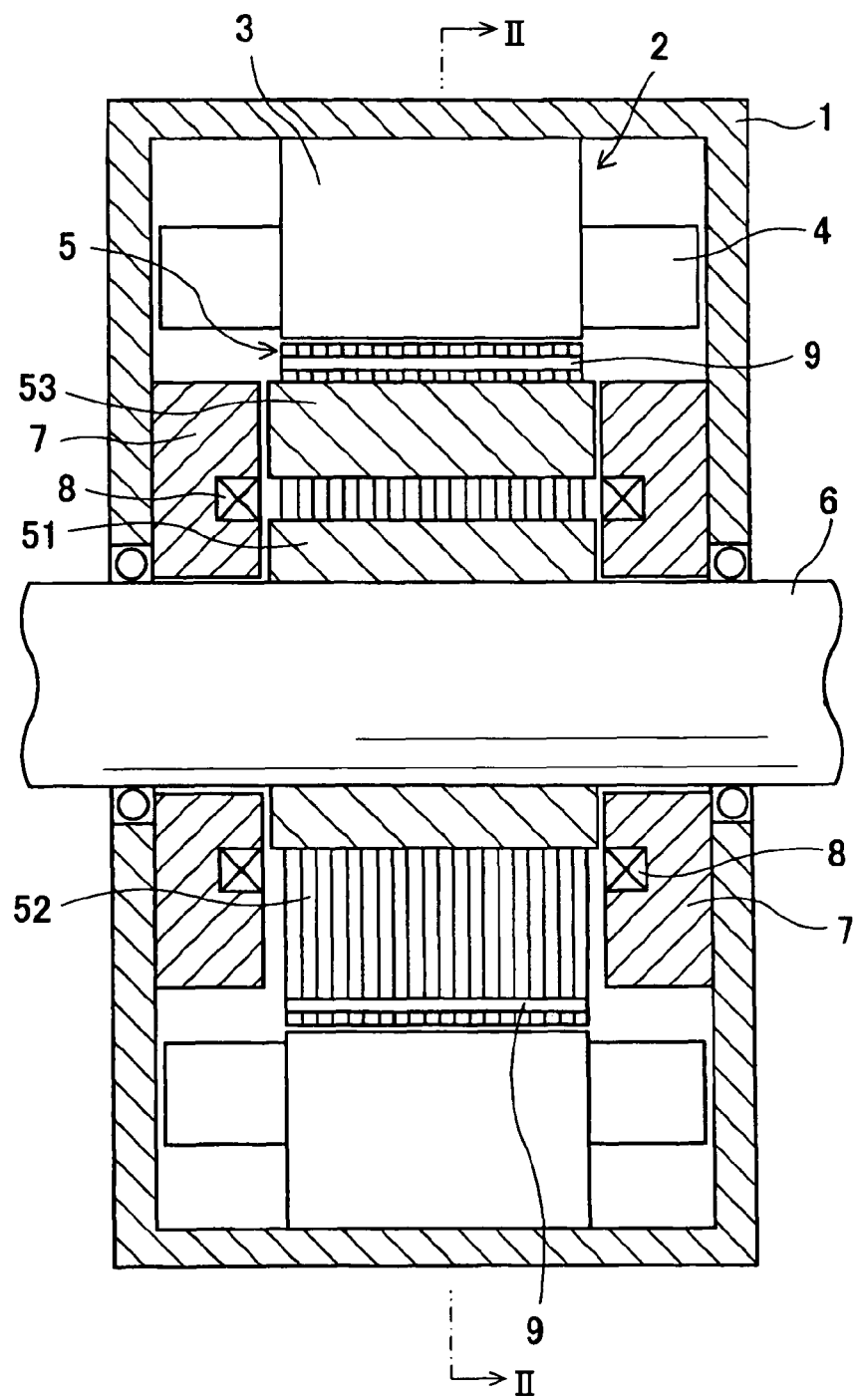
FIG. 1 is a schematic longitudinal sectional view of a hybrid excitation-type synchronous machine according to a first embodiment.

Referring to FIG. 1, a motor frame 1 supports a stator 2. The stator 2 includes a stator core 3 and a stator coil 4. The stator core 3 is made of a cylindrical soft magnetic member fixed to the inner peripheral surface of the motor frame 1. The stator coil 4 is wound on the stator core 3. A rotor core 5 is press-fitted and fixed to a rotation shaft 6 and accommodated radially inside the stator core 3. A pair of stationary magnetic path members 7, a pair of excitation coils 8 and eight permanent magnets 9 fitted to the rotor core 5 are provided. A small gap is provided between the outer peripheral surface of the rotor core 5 and the inner peripheral surface of the stator core 3.

The pair of the stationary magnetic path members 7 is separately fixed to end surfaces of the motor frame 1 and face the rotor core 5 with small gaps relative to the end surfaces of the rotor core 5. The stationary magnetic path member 7 is a soft magnetic member made in a thick ring plate form and provided outside the rotary shaft 6 coaxially. The excitation coil 8 is accommodated in a ring-shaped groove, which is recessed on the rotor-side end surface of the stationary magnetic path member 7. The groove is recessed in a substantially central part in the radial direction on the rotor-side end surface.

The rotor core 5 includes an inner cylindrical part 51, an outer cylindrical part 52 and four axial magnetic path members 53. The inner cylindrical part 51 is made of a soft magnetic cylindrical member. The outer cylindrical part 52 is made of ring-shaped steel plates stacked in the axial direction. The axial magnetic path member 53 is fixed to the outer cylindrical part 52 and extends in the axial direction. The outer cylindrical part 52 is divided into eight rotor magnetic pole parts in the peripheral direction by flux barriers 54, each of which is provided to extend in the radial direction and spaced apart by an angular interval of 45° in the peripheral direction.

An odd-numbered rotor magnetic pole part 6A is formed by the outer cylindrical part 52, which is generally fan-shaped in section in the radial direction. The radial inner end of the odd-numbered rotor magnetic pole part 6A of the outer cylindrical part 52 is in tight contact with the outer peripheral surface of the inner cylindrical part 51. The odd-numbered permanent magnet 9 is embedded in the outer peripheral part of the odd-numbered rotor magnetic pole part 6A to magnetize the outer peripheral surface part of the odd-numbered rotor magnetic pole part 6A to N-pole, for instance.

The even-numbered rotor magnetic pole part 6B is formed by the outer peripheral part 52 and the axial magnetic path member 53. The outer peripheral part 52 is generally arcuate in section in the radial direction. The axial magnetic path member 53 is fixed to the radial inner end of the outer cylindrical part 52 and extends in the axial direction. The radial inner end of the even-numbered rotor magnetic pole part 6B of the outer cylindrical part 52 is located at a position largely spaced apart from the outer peripheral surface of the inner cylindrical part 51. The radial inner end face of the axial magnetic path member 53 is also largely spaced apart from the outer peripheral surface of the inner cylindrical part 51. The even-numbered permanent magnet 9B is embedded in the outer peripheral part of the odd-numbered rotor magnetic pole part 6B to magnetize the outer peripheral surface part of the even-numbered rotor magnetic pole part 6B to S-pole, for instance.

Figure 3:
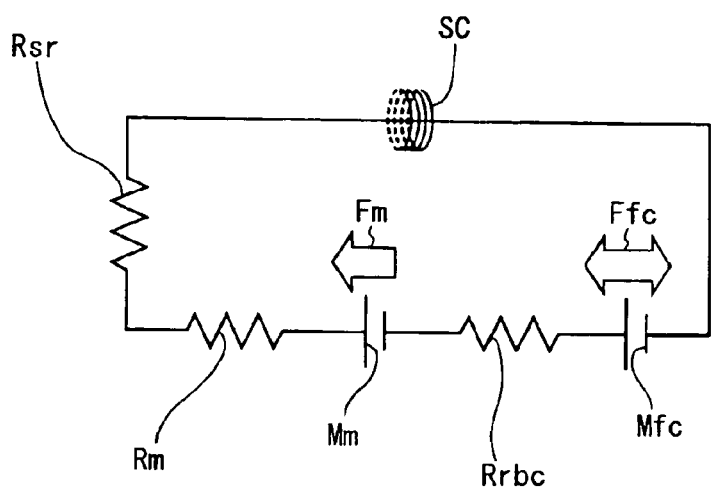
FIG. 3 is a magnetic equivalent circuit of a field magnetic flux path of the hybrid excitation-type synchronous machine shown in FIG. 1.

Supply and reception of magnetic flux between the stationary magnetic path member 7 and the axial magnetic path member 53, the inner cylindrical part 51 is described below. The axial magnetic path member 53 and the inner cylindrical part 51 protrude in both axial directions from the outer cylindrical part 52 by a predetermined distance. The axial magnetic path member 53 and the inner cylindrical part 51 face the stationary magnetic path member 7 with a small gap in the axial direction. As a result, the even-numbered rotor magnetic pole part 6B supplies and receives magnetic flux to and from the soft magnetic inner cylindrical part 51 through the axial magnetic path member 53 and the stationary magnetic path member 7, which are both soft magnetic. Magnetic flux generated by the permanent magnet 9 of the odd-numbered rotor magnetic pole part 6A flows to the permanent magnet 9 on the outer peripheral surface of the even-numbered rotor magnetic pole 6B through the stator core 3. The magnetic flux then flows through the axial magnetic path member 53, the stationary magnetic path member 7 and the inner cylindrical part 51 and returns to the odd-numbered rotor magnetic pole part 6A. The magnetic equivalent circuit, in which the magnetic flux of the magnet flows, is shown in FIG. 3. In FIG. 3, SC, Ffc, Fm, Mfc, Mm, Rsr, Rm, and Rrbc indicate, respectively, a stator coil, magnetic flux of an excitation coil, magnetic flux of a magnet, magnetomotive force of the excitation coil, magnetomotive force of the magnet, magnetic resistance of an air gap between an armature stator and a rotor, magnetic resistance of the magnet, and magnetic resistance of an air gap between the rotor and a stationary bypass core.

Since the excitation coil 8 is wound on the stationary magnetic path member 7, the permanent magnet 9 of the odd-numbered rotor magnetic pole part 6A, the permanent magnet 9 of the even-numbered rotor magnetic pole part 6B and the excitation coil 8 are arranged in series in the magnetic circuit. The excitation coil 8 on both sides of the rotor core 5 are arranged in parallel in the magnetic circuit.

According to this arrangement, the rotor magnetic flux (field magnetic flux) flowing from the rotor magnetic pole parts 6A, 6B to the stator core 3 can be increased or decreased by adjusting the current of the excitation coil 8. The excitation current supplied to the excitation coil 8 in demagnetization should be limited to be within a range, which will not cause permanent demagnetization of the permanent magnet 9.

According to the present embodiment, in a case of low rotation speeds, for example, in which the counter-electromotive force induced in the stator coil 4 is small, the magnetic flux of the permanent magnet 9 can be used to the maximum extent. This is because the magnet magnetic flux of the permanent magnet 9 is not shunted to a bypass magnetic circuit as opposed to the conventional case. As a result, the loss of the excitation current can be reduced to zero in an operation condition, in which the motor is used most.

Next, according to the present embodiment, the magnetic path is formed such that the magnet magnetic flux of the even-numbered rotor magnetic pole part 6B is induced to the end surface of the rotor core 5 by the axial magnetic path member 53 and then returned to the inner cylindrical part 51 through the stationary magnetic path member 7. As a result, the length of the magnetic path of the field magnetic flux can be shortened and the weight of the soft magnetic member forming the magnetic path of the field magnetic flux can be reduced.

Further, according to the present embodiment, the pair of the stationary magnetic path member 7 and the excitation coil 8 is arranged in proximity to the end surface of the rotor core 5. As a result, the magnet magnetic flux flowing from the permanent magnet 9 of the even-numbered rotor magnetic pole part 6B to the axial magnetic path member 53 is divided into both sides in the axial direction in the axial magnetic path member 53. As a result, the area of cross section perpendicular to the axial magnetic path member 53 can be reduced and the magnetic path of the field magnetic flux can be made compact. Thus, the soft magnetic member forming the magnetic path of the field magnetic flux can be reduced in weight.

Further, in a case that magnetic flux, which is far greater than that of the magnetic flux of the permanent magnet 9, is required, for example in a case of starting the motor, the field magnetic flux can be increased by aligning the direction of magnetization of the excitation coil 8 with that of the permanent magnet 9.

Second Embodiment

Figure 4:
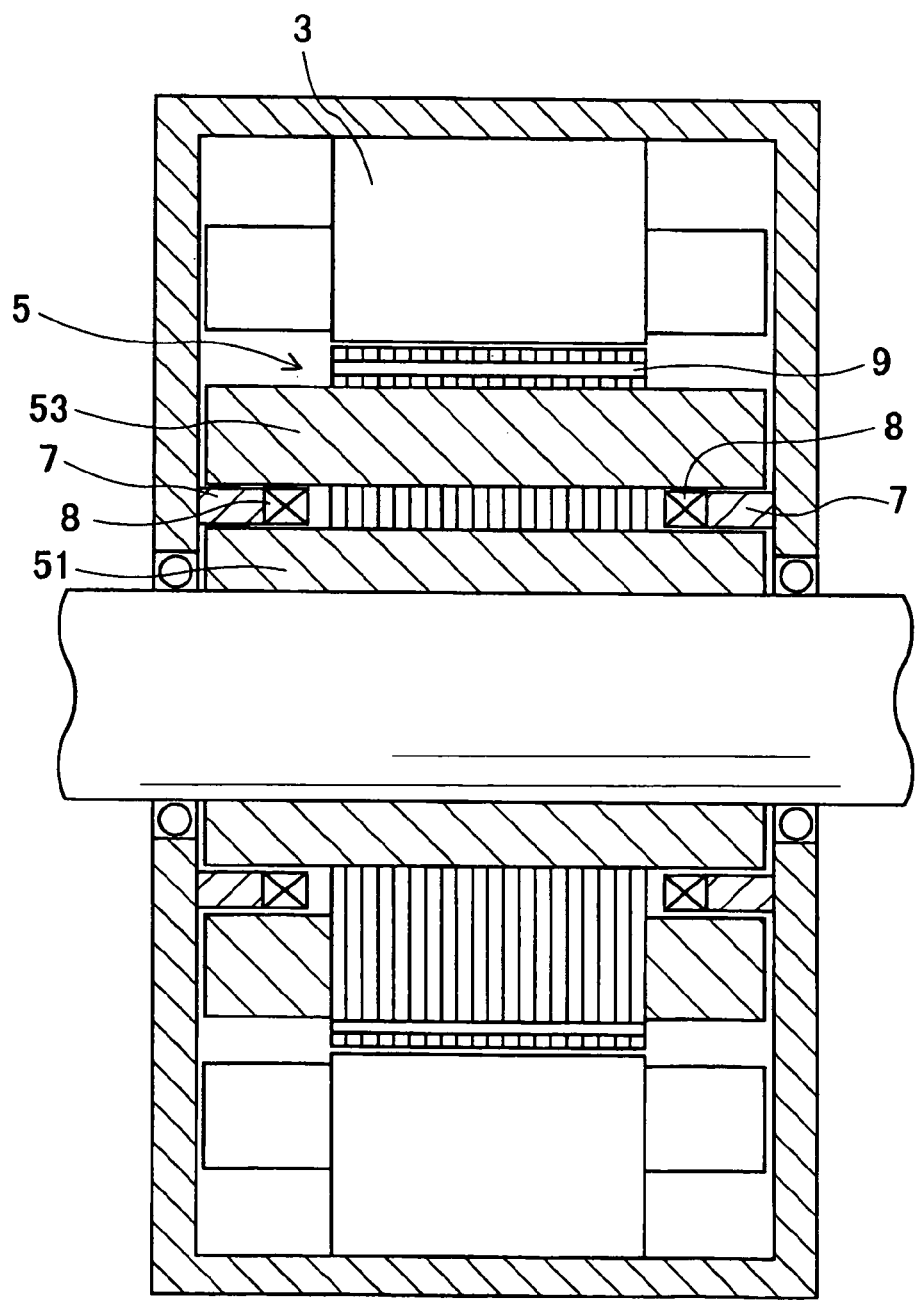
FIG. 4 is a schematic longitudinal sectional view of a hybrid excitation-type synchronous machine according to a second embodiment.

The hybrid excitation-type synchronous machine according to a second embodiment is different from the first embodiment in that, as shown in FIG. 4, the stationary magnetic path member 7, the inner cylindrical part 51 and the axial magnetic path member 53 have different shapes. Specifically, the inner cylindrical part 51 and the axial magnetic path member 53 protrude more in the axial direction than in the first embodiment and face the peripheral surface of the cylindrical stationary magnetic path member 7 with small gaps in the radial direction. Thus, magnetic attraction force between the inner cylindrical part 51, the axial magnetic path member 53 and the stationary magnetic path member 7 works in the radial direction. As a result, the axial thrust working on the rotor core 5 can be reduced.

Third Embodiment

Figure 5:
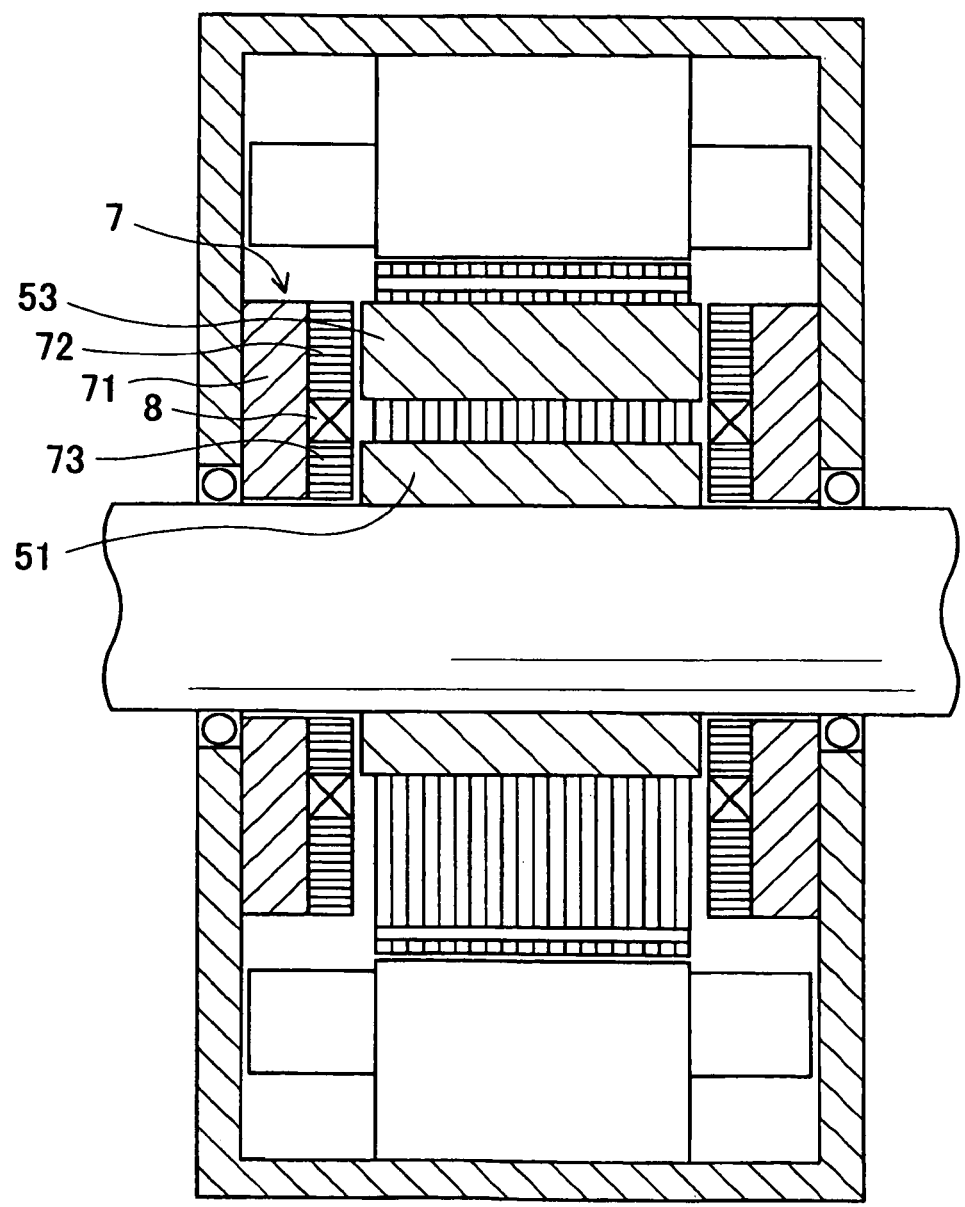
FIG. 5 is a schematic longitudinal sectional view of a hybrid excitation-type synchronous machine according to a third embodiment.

The hybrid excitation-type synchronous machine according to a third embodiment is different from the first embodiment in that, as shown in FIG. 5, the stationary magnetic path member 7 has different shape. Specifically, the stationary magnetic path member 7, which is soft magnetic, is formed of spirally-wound steel plate parts 72 and 73. However, the entire shape of the stationary magnetic path member 7 according to the third embodiment is generally the same as that of the stationary magnetic path member 7 according to the first embodiment. The spirally-wound steel plate part 72 is located outside the excitation coil 8 in the radial direction and formed by spirally winding a thin electromagnetic belt steel plate. The spirally-wound plate part 73 is located inside the excitation coil 8 in the radial direction and formed by spirally winding a thin electromagnetic belt steel plate. According to this configuration, the eddy current in the stationary magnetic path member 7 can be reduced.

The foregoing embodiment may be modified as follows.

Since the inner cylindrical part has no roughness on the end faces, the spirally-wound steep plate part 73 may be eliminated and instead the part may be made of soft steel and integrated with the ring plate part 71 made of soft steel.

Figure 2:
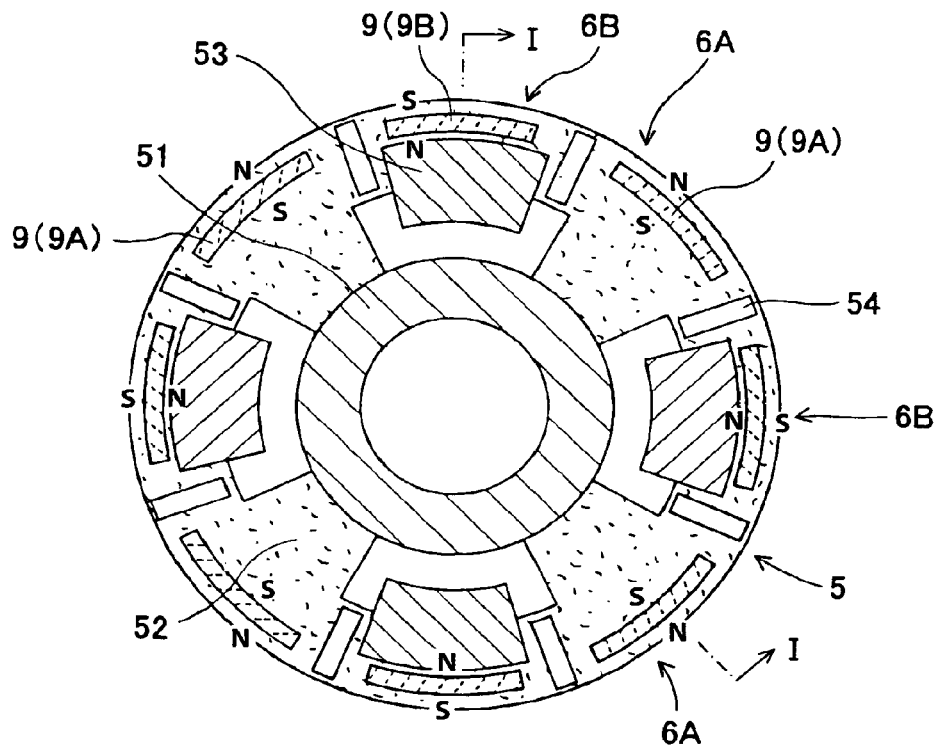
FIG. 2 is a schematic radial sectional view of the hybrid excitation-type synchronous machine shown in FIG. 1.

Ring-shaped soft steel members may be jointed to the end faces of the four axial magnetic path members 53 protruding in the axial direction at a pitch interval of 90° as shown in FIG. 2, so that the ring-shaped soft steel member and the stationary magnetic member 7 may be arranged to face each other. According to this configuration, distribution of the magnetic flux in the space between the ring-shaped soft steel member and the stationary magnetic path member 7 is made uniform. As a result, the eddy current can be reduced without using the spirally-wound steel plate part 72.

What is claimed is:
1. A hybrid excitation synchronous machine comprising:
a stator core fixed to a motor frame and wound with a stator coil;
a soft magnetic rotor core fixed to a rotation shaft and facing an inner peripheral surface of the stator core through a small gap;
an even number of permanent magnets fixed to the rotor core in a predetermined pitch in a peripheral direction and magnetized in opposite magnetic polarities alternately for generating magnet magnetic flux that crosses the stator coil;
an excitation coil for adjusting an amount of field magnetic flux crossing the stator coil;
a stationary magnetic path member fixed to the motor frame and wound with the excitation coil;
the rotor core including a soft magnetic inner cylindrical part fitted to the rotation shaft and even number of soft magnetic rotor magnetic pole parts located outside the inner cylindrical part in a radial direction;
the permanent magnets including first permanent magnets fixed to even-numbered rotor magnetic pole parts that are located relative to an outer peripheral surface of the inner cylindrical part through a predetermined gap, for magnetizing the even-numbered rotor magnetic pole parts to first magnetic polarity;

the permanent magnets including second permanent magnets fixed to odd-numbered rotor magnetic pole parts that are located in tight contact with the outer peripheral surface of the inner cylindrical part, for magnetizing the odd-numbered rotor magnetic pole parts to second magnetic polarity; and the stationary magnetic path member being located in proximity to an end surface of the rotor core to face the inner cylindrical part and the even-numbered rotor magnetic pole parts through predetermined gaps, wherein the excitation coil is arranged in magnetic series relation with the first permanent magnet and the second permanent magnet in a magnetic circuit that is formed by the first permanent magnet, the second permanent magnet, the stator core, the odd-numbered rotor magnetic pole part, the even-numbered rotor magnetic pole part, the stationary magnetic path member and the inner cylindrical part.

2. The hybrid excitation synchronous machine according to claim 1, wherein:
a pair of the stationary magnetic path member and the excitation coil is located on both end faces of the rotor core.

3. The hybrid excitation synchronous machine according to claim 1, wherein:
the stationary magnetic path member faces the inner cylindrical part and the even-numbered rotor magnetic pole parts through the predetermined gaps in an axial direction.

4. The hybrid excitation synchronous machine according to claim 1, wherein:
the stationary magnetic path member faces the inner cylindrical part and the even-numbered rotor magnetic pole parts through the predetermined gaps in the radial direction.

5. A hybrid excitation synchronous machine comprising:
a stator core fixed to a motor frame and wound with a stator coil;
a soft magnetic rotor core fixed to a rotation shaft and facing an inner peripheral surface of the stator core through a small gap;
an even number of permanent magnets fixed to the rotor core in a predetermined pitch in a peripheral direction and magnetized in opposite magnetic polarities alternately for generating magnet magnetic flux that crosses the stator coil;
an excitation coil for adjusting an amount of field magnetic flux crossing the stator coil;
a stationary magnetic path member fixed to the motor frame and wound with the excitation coil;
the rotor core including a soft magnetic inner cylindrical part fitted to the rotation shaft and even number of soft magnetic rotor magnetic pole parts located outside the inner cylindrical part in a radial direction;
the permanent magnets including first permanent magnets fixed to even-numbered rotor magnetic pole parts that are located relative to an outer peripheral surface of the inner cylindrical part through a predetermined gap, for magnetizing the even-numbered rotor magnetic pole parts to first magnetic polarity;
the permanent magnets including second permanent magnets fixed to odd-numbered rotor magnetic pole parts that are located in tight contact with the outer peripheral surface of the inner cylindrical part, for magnetizing the odd-numbered rotor magnetic pole parts to second magnetic polarity; and
the stationary magnetic path member being located in proximity to an end surface of the rotor core to face the inner cylindrical part and the even-numbered rotor magnetic pole parts through predetermined gaps, wherein:
the rotor core includes the inner cylindrical part, a ring-shaped axially-stacked steel plates forming a radially outside part of the even-numbered rotor magnetic pole parts and the odd-numbered rotor magnetic pole parts, and soft magnetic axial magnetic path members contacting radially inner end surfaces of the even-numbered rotor magnetic pole parts of the axially-stacked steel plates and extending in the axial direction; and
the axial end part of the axial magnetic path member faces the stationary magnetic path member through predetermined gap.

6. The hybrid excitation-type synchronous machine according to claim 1, further comprising:
an axial magnetic path member (53) fixed to the even-numbered rotor magnetic pole parts and spaced apart from the inner cylindrical part in the radial direction.

7. The hybrid excitation-type synchronous machine according to claim 1, further comprising:
a flux barrier (54) provided between the first permanent magnet and the second permanent magnet adjacent to each other and extending in the radial direction.

* * * * *